United States Patent
D'Errico et al.

(10) Patent No.: US 10,017,369 B2
(45) Date of Patent: Jul. 10, 2018

(54) MACHINE, SYSTEM, AND METHOD FOR FILLING CONTAINER WITH POURABLE PRODUCT

(71) Applicant: SIDEL PARTICIPATIONS S.A.S., Octeville-sur-Mer (FR)

(72) Inventors: Stefano D'Errico, Parma (IT); Enrico Cocchi, Parma (IT)

(73) Assignee: SIDEL PARTICIPATIONS S.A.S., Octeville-sur-Mer (FR)

( * ) Notice: Subject to any disclaimer, the term of this patent is extended or adjusted under 35 U.S.C. 154(b) by 97 days.

(21) Appl. No.: 15/081,710

(22) Filed: Mar. 25, 2016

(65) Prior Publication Data

US 2016/0297660 A1 Oct. 13, 2016

(30) Foreign Application Priority Data

Apr. 8, 2015 (EP) .................................... 15162865

(51) Int. Cl.
*B67C 3/00* (2006.01)
*B67C 3/20* (2006.01)
(Continued)

(52) U.S. Cl.
CPC ................ *B67C 3/007* (2013.01); *B67C 3/20* (2013.01); *B67C 3/225* (2013.01); *G01F 1/3254* (2013.01)

(58) Field of Classification Search
CPC ........... B67C 3/20; B67C 3/007; B67C 3/225; G01F 1/3254
(Continued)

(56) References Cited

U.S. PATENT DOCUMENTS 5,091,863 A * 2/1992 Hungerford .............. E03F 7/00 141/1
6,101,885 A * 8/2000 Touzin .................. G01F 1/3209 73/861.22

(Continued)

FOREIGN PATENT DOCUMENTS

JP H11-342994 12/1999
WO WO 98/43051 A2 10/1998
(Continued)

OTHER PUBLICATIONS

European Search Report dated Sep. 23, 2015 by the European Patent Office in counterpart European Patent Application No. 15162865.8.

*Primary Examiner* — Timothy L Maust
(74) *Attorney, Agent, or Firm* — Finnegan, Henderson, Farabow, Garrett & Dunner, L.L.P.

(57) ABSTRACT

A filling system for filling a container with a pourable product, comprising: a tank configured to be filled with the pourable product; at least one filling device including a local control unit having a control module configured to selectively allow filling of the container with the pourable product; at least one duct interposed between the tank and the filling device; and at least one vortex flowmeter disposed along the duct and configured to generate a pulse-train detection signal as a function of a flow rate of the pourable product along the duct, wherein the local control unit of the filling device includes a processing module configured to process the detection signal from the at least one vortex flowmeter in order to determine an amount of the pourable product flowing into the container, as a function of a number of pulses of the detection signal.

20 Claims, 6 Drawing Sheets

(51) Int. Cl.
*G01F 1/32* (2006.01)
*B67C 3/22* (2006.01)

(58) Field of Classification Search
USPC .................................. 141/94, 95, 192, 198
See application file for complete search history.

(56) References Cited

U.S. PATENT DOCUMENTS

| | | | | |
|---|---|---|---|---|
| 6,170,338 | B1* | 1/2001 | Kleven | G01F 1/3254 73/861.22 |
| 6,212,975 | B1* | 4/2001 | Cook | G01F 1/3254 702/190 |
| 6,530,402 | B2* | 3/2003 | Suzuki | B65B 3/30 141/192 |
| 6,763,860 | B2* | 7/2004 | Jungmann | B01F 13/1055 141/104 |
| 7,066,217 | B2* | 6/2006 | Ludwig | B65B 1/42 141/1 |
| 7,212,928 | B2* | 5/2007 | Cook | G01F 1/3254 702/45 |
| 7,779,099 | B2* | 8/2010 | Raghunathan | G06Q 10/087 221/6 |
| 2005/0229716 | A1* | 10/2005 | Unsworth | G01F 1/66 73/861.53 |
| 2013/0333800 | A1* | 12/2013 | Cocchi | B67C 3/20 141/192 |

FOREIGN PATENT DOCUMENTS

| WO | WO 2004/023081 A2 | 3/2004 |
|---|---|---|
| WO | WO 2012/085828 A1 | 6/2012 |

* cited by examiner

MACHINE, SYSTEM, AND METHOD FOR FILLING CONTAINER WITH POURABLE PRODUCT

CROSS-REFERENCE TO RELATED APPLICATIONS

This application claims the benefit of priority of European Patent Application No. 15162865.8, filed on Apr. 8, 2015, which is incorporated herein by reference.

TECHNICAL FIELD

The present invention relates to a filling system and method for filling a container with a pourable product, and to a corresponding filling machine.

The containers to be filled may be any type of containers, such as for example cans or bottles made of glass, plastics (PET), aluminum, steel or composites, and may be filled with any type of pourable products, in particular food products, including carbonated liquids, such as sparkling water, soft drinks, beer; non-carbonated liquids, such as still or flat water, juices, teas, sport drinks, wine; but also liquid cleaners or emulsions.

BACKGROUND

In the field of bottling of liquids, a system is known comprising a feeding conveyor for feeding a succession of empty containers to a filling machine, in turn comprising a rotating conveyor (so called "carousel"), carrying a number of filling devices. Each filling device includes a filling valve, which is displaceable between an open positions, in which it allows the flow of a pourable product within the respective container, and a closed position, in which it prevents the pourable product from flowing within the container.

The filling devices are mounted to rotate continuously about a longitudinal axis, to engage the empty containers and fill the containers with the pourable product, coming from a product tank. In case of carbonated liquids, filling operations may include also feeding pressurized gas, such as carbon dioxide, into the containers to pressurize them, before filling the same containers with a carbonated liquid, and, afterwards, decompressing the filled containers.

In the processing plant, the containers may then be feed to a capping machine, which is coupled to the filling machine by at least one transfer wheel and which closes the containers with respective caps, and/or to other processing machines, such as labeling machines.

The tank containing the pourable product may be positioned on the carousel, or externally thereto, and it is fluidically connected to the filling devices by means of respective ducts. A flowmeter is arranged along each duct, to measure, when the respective filling valves are arranged in the open positions, the flow rate of fluid by which the containers are filled.

The measurement of the flow rate performed by the flowmeters is used by local control units associated with each filling device, to control actuation of the filling valves between the respective open and closed positions, so as to fill the containers with a desired volume of pourable food product and reach a desired and repeatable filling level within the same containers.

In particular, use of a vortex flowmeter (also known as vortex shedding flowmeter) has been proposed, to measure the flow rate of the pourable product reaching the filling devices; for example, document WO 2012/085828 A1, in the name of the present Applicant, discloses use of a vortex flowmeter in a filling system of a filling machine.

As schematically shown in FIG. 1, a vortex flowmeter 1 comprises a main tubular body 2, having a longitudinal axis A and designed to be arranged along the duct interposed between the tank and a respective filling device (here not shown); tubular body 2 defines an inlet mouth 2a and an outlet mouth 2b, designed to be coupled to the duct for passage of fluid.

An obstacle 4, e.g. having a trapezoidal axial section, is inserted in the tubular body 2, so as to define an impact surface 4a orthogonal to longitudinal axis A.

A sensor 5, in particular a piezoelectric sensor, is arranged within the tubular body 2, downstream the obstacle 4 proceeding from inlet mouth 2a towards outlet mouth 2b.

When the pourable product passes through the passage defined by tubular body 2, it impinges upon impact surface 4a of obstacle 4, generating a train of vortexes 6 (usually known as Karman vortexes), the frequency of which is proportional to the speed of the pourable product.

Sensor 5 is configured to transform the oscillating pressure spikes $\Delta p$ associated with vortexes 6 into an electrical quantity V, that may be processed to generate a detection signal, indicative of the flow rate of the pourable product.

In particular, the detection signal output by the vortex flowmeter 1 is a pulsed signal (a digital signal including a train of pulses, e.g. rectangular pulses), where each pulse (having rise and fall edges) corresponds to a detected pressure spike and an associated vortex 6; the frequency of the generated pulses corresponds to the frequency of vortexes 6, and so is substantially proportional to the flow rate.

Although advantageous in many respects (for example since it allows measuring flow rate also of fluids having a very low electrical conductivity, e.g. lower than 15 µS, contrary to other types of flowmeters, e.g. magnetic flowmeters), the present Applicant has realized that use of a vortex flowmeter to control operation of the filling devices also has some issues, at least in certain operating conditions.

For example, environment vibrations, e.g. machine vibrations, may influence the sensor 5, and cause generation of a number of spurious pulses (i.e. not related to vortex generation due to fluid passage).

Moreover, when the filling valves in the filling devices are actuated to close, or open, the fluid passage, burst pressure or back-flow may be generated in the duct, and therefore within tubular body 2 of vortex flowmeter 1. This burst pressure may generate a number of pulses, again not related to the flow of pourable product within the duct, which are nonetheless detected by sensor 5 of vortex flowmeter 1.

In general, the present Applicant has realized that computation of the amount of product flowing within the duct towards the filling devices, based on the output of a vortex flowmeter, may be subject to a number of errors (according to varying operating conditions), which may lead to corresponding errors in the determination of the level of product in the filled containers.

Moreover, due to the high speed and number of filling operations performed by the filling machine, real time compensation or correction of the above errors (during execution of the filling operations) may often prove to be a difficult task.

BRIEF SUMMARY

The aim of the present solution is consequently to solve, at least in part, the problems previously highlighted, and in general to improve operation of a filling system based on the use of a vortex flowmeter to control the amount of product in the filled containers.

According to the present solution, a filling system and method, and a corresponding filling machine, are provided, as defined in the appended claims.

BRIEF DESCRIPTION OF THE DRAWINGS

For a better understanding of the present invention, preferred embodiments thereof are now described, purely by way of non-limiting examples, with reference to the attached drawings, wherein.

DETAILED DESCRIPTION

Figure 2:
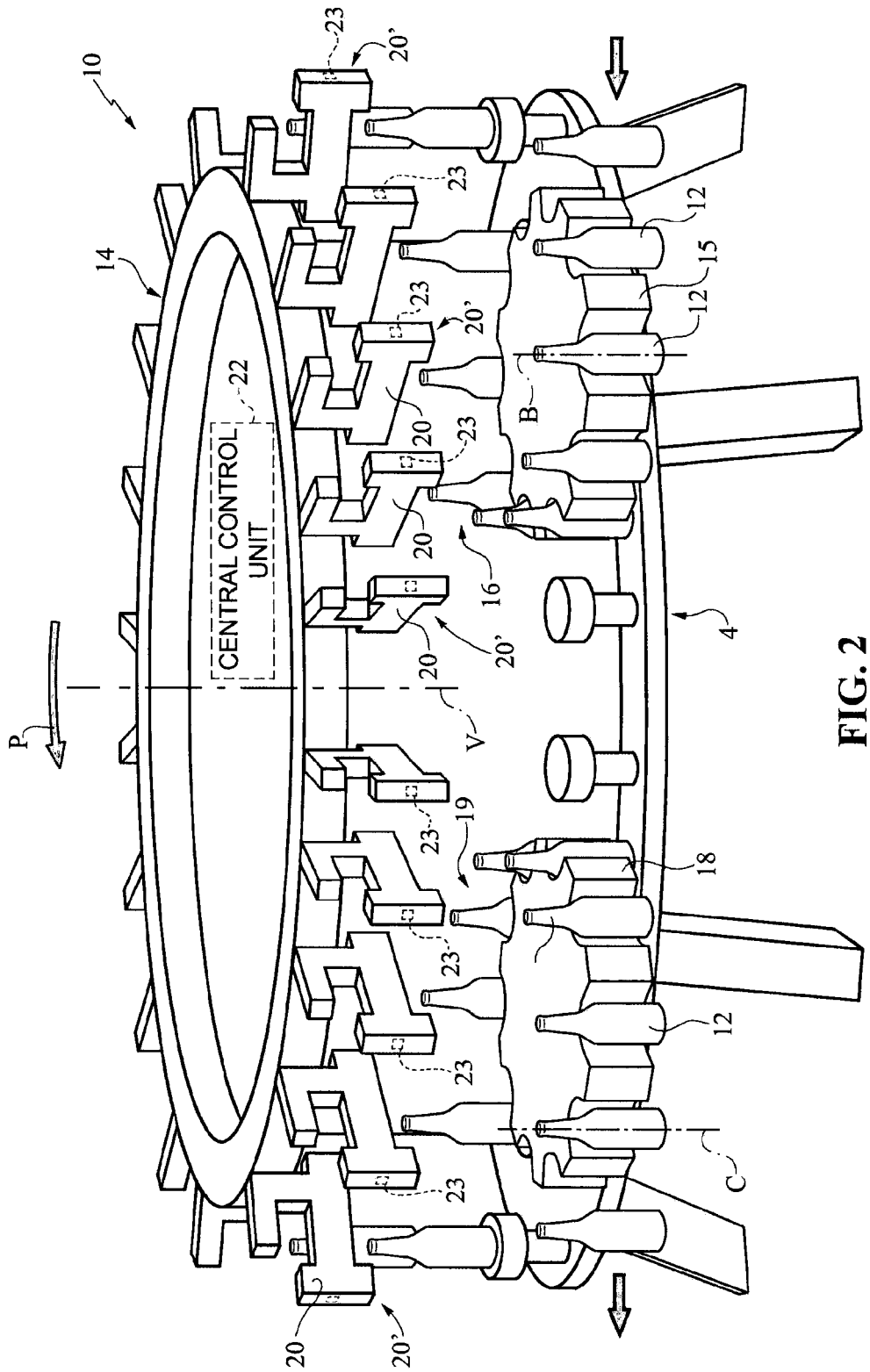
FIG. 2 is a schematic depiction of a filling machine.

FIG. 2 schematically shows a filling machine for a container processing plant, denoted as a whole with 10 and configured for filling containers 12, in the example glass bottles, with a pourable product, for example a non-carbonated, or flat, pourable food product (but it is again underlined that other types of containers and liquids, e.g. carbonated liquids, may as well be envisaged).

Figure 1:
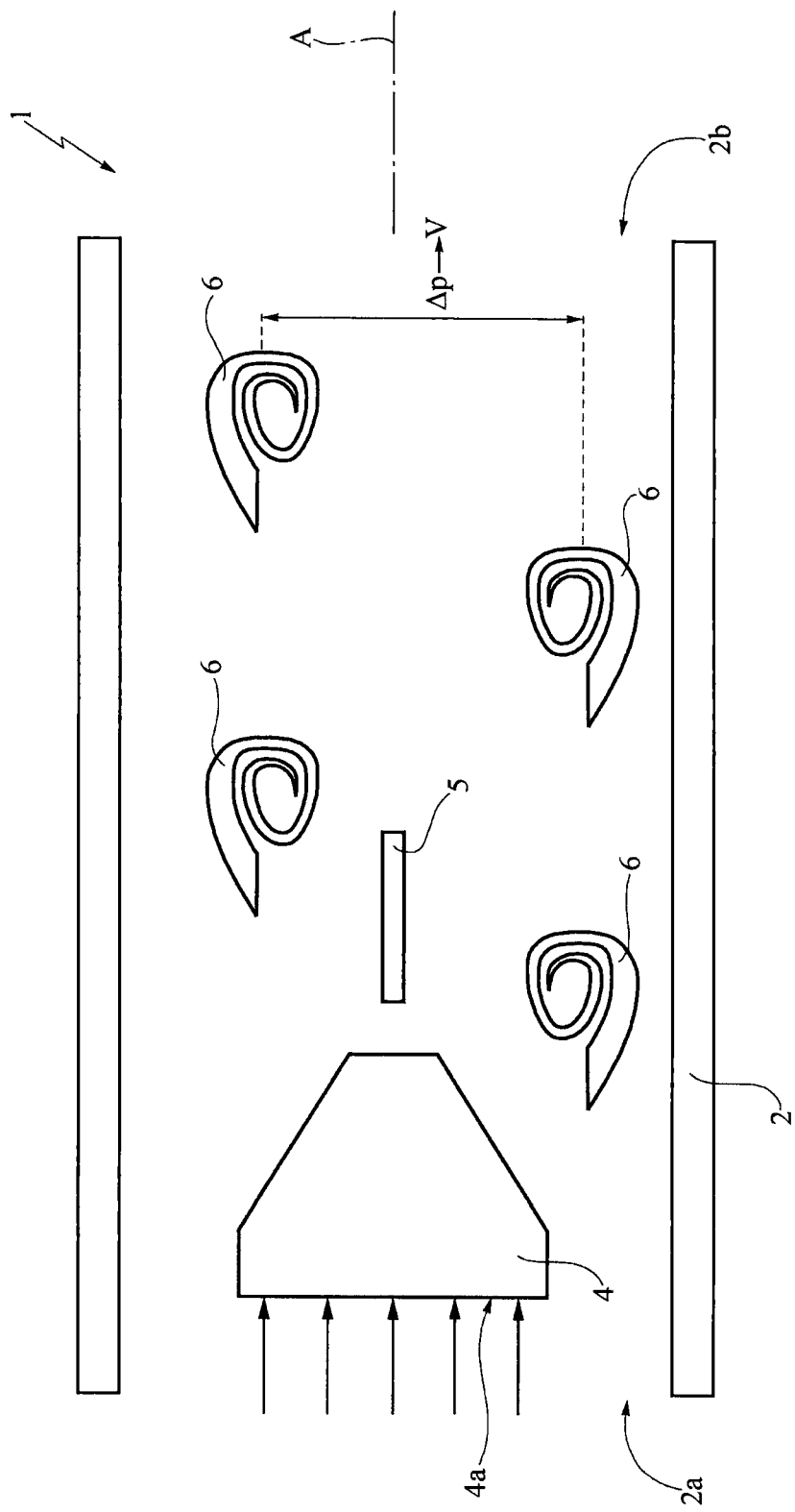
FIG. 1 is a schematic representation of a vortex flowmeter.

Filling machine 10 comprises a conveying device, including a rotating conveyor (or carousel) 14, which is mounted to rotate continuously (anticlockwise in FIG. 1) about a substantially vertical axis V.

The rotating conveyor 14 receives a succession of empty containers 12 (e.g. originating from a container forming machine of the processing plant) from an input transfer wheel 15, which is coupled thereto at a first transfer station 16 and is mounted to rotate continuously about a respective vertical axis B.

The rotating conveyor 14 releases a succession of filled containers 12 to an output transfer wheel 18 (e.g. so as to be received by a labeling machine and/or a capping machine of the processing plant), which is coupled thereto at a second transfer station 19 and is mounted to rotate continuously about a respective vertical axis C.

Filling machine 10 comprises a number of filling systems 20', each including a respective filling device 20, which are equally spaced about vertical axis V, are mounted along a peripheral edge of rotating conveyor 14, and are moved by the same rotating conveyor 14 along a path P extending about vertical axis V and through transfer stations 16 and 19.

Each filling device 20 is designed to receive at least one container 12 to be filled, and to perform, during its rotation along path P, filling operations according to a filling "recipe", in order to fill container 12 with the pourable product; the recipe may include steps of pressurization or depressurization of the container, opening/closing of the filling valve, displacement of movable elements, activation of actuators and so on.

Each filling device 20 generally includes at least one fluidic conduit and at least one filling valve (here not shown), which is designed to selectively couple the container 12 to a product tank (also not shown), of filling machine 10.

In a manner not shown in detail, each filling device 20 includes a main body, for example with a tubular configuration, having a vertical extension along a longitudinal axis that is substantially parallel to vertical axis V of rotating conveyor 14, and mechanically coupled to the rotating conveyor 14. The main body includes, at a bottom portion thereof, a container receiving part, designed to releasably engage a neck of the container 12 that is to be filled during the filling operations.

Operation of the filling devices 20 is controlled by a central control unit 22 (shown schematically), designed to control general operation of the filling machine 10, e.g. providing suitable control signals for the actuation of the filling valves in order to cause execution of the desired filling recipe.

filling devices 20 are in turn provided with local control units 23 (shown schematically, usually known as "pilot valves"), designed to receive control signals from the central control unit 22, e.g. in order to control actuation of the corresponding filling valves, and designed to provide feedback signals to the same central control unit 22 about operation of the same filling valves.

Electrical communication between the central control unit 22 and the local control units 23 may be implemented through a communication bus (here not shown), for example a serial bus.

Figure 3:
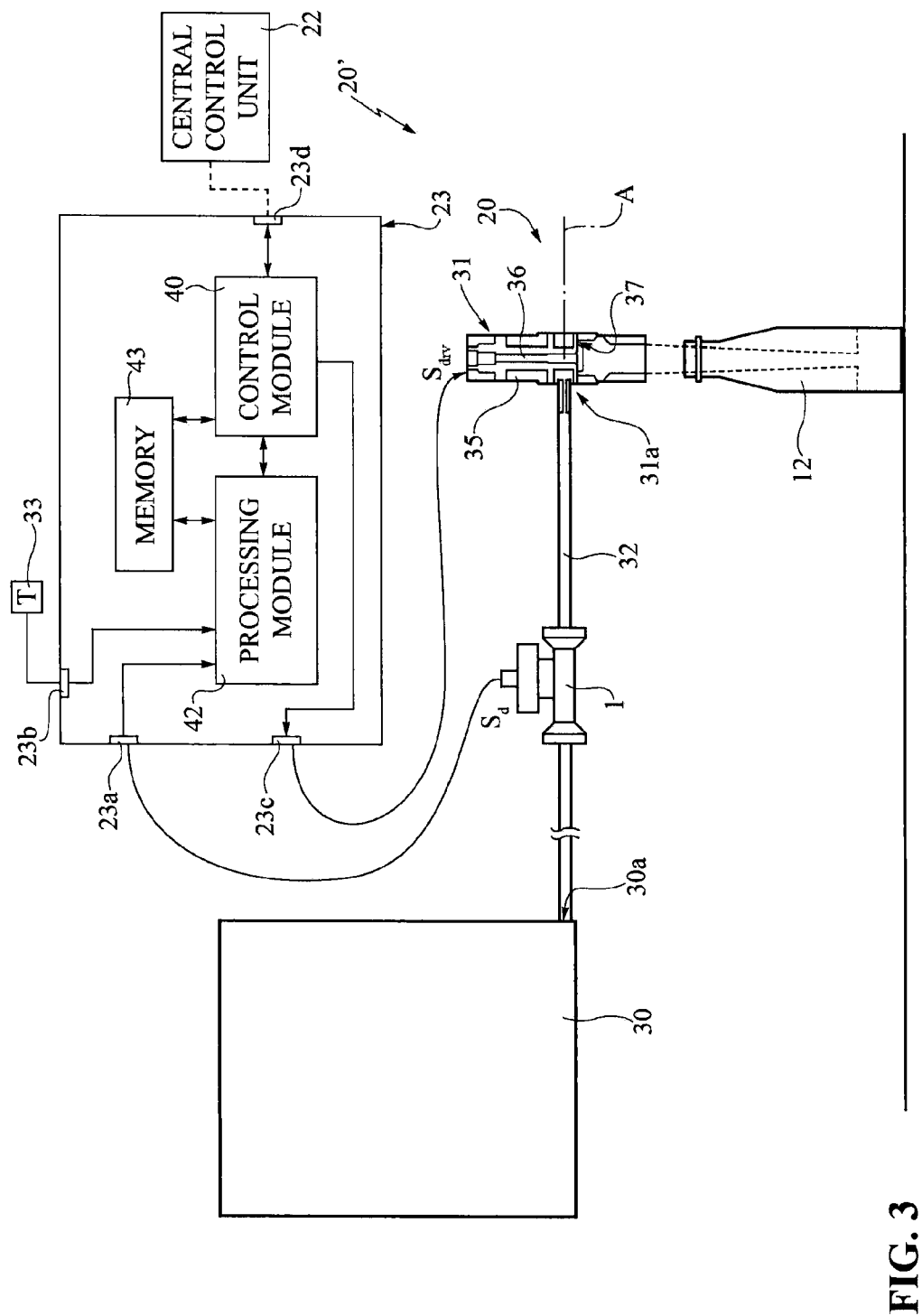
FIG. 3 is a diagrammatic representation of a filling system in the filling machine of FIG. 2, according to one embodiment of the present solution.

With reference to FIG. 3, filling systems 20' of filling machine 10 are now discussed in more details, with reference to a single one of them (for reasons of simplicity of illustration).

Filling system 20' comprises:
  a tank 30 filled with a pourable product at a given pressure;
  at least one filling device 20, including a respective filling valve, here denoted with 31, designed to fill a respective container 12 with the pourable product, and a respective local control unit 23, configured to control the filling valve 31; and
  at least one duct 32 extending along a respective longitudinal axis A, interposed between an outlet mouth 30a of the tank 30 and an inlet mouth 31a of the corresponding filling valve 31.

Tank 30 is connected to ducts 32 of filling systems 20' of filling machine 10 and may be arranged externally to the rotating conveyor 14 thereof, or internally to the same rotating conveyor 14; a single tank 30 may be provided for all filling systems 20'.

In more details, filling valve 31 comprises a hollow housing 35 defining inlet mouth 31a and a shutter element 36 that slides parallel to the vertical axis within housing 35. Shutter element 36 may be displaced between a closed position, in which it prevents the pourable product from flowing from the respective duct 32 to the container 12 through an opening 37, and an open position in which it allows the pourable product to flow from the respective duct 32 to container 12.

In a possible implementation, local control unit 23 may be provided integral to the housing 35, integrated in a printed circuit board coupled to an upper portion of the same housing.

Filling system 20' further comprises at least one vortex flowmeter, here again denoted with 1 (and configured substantially as discussed with reference to FIG. 1), interposed along respective duct 32 between the tank 30 and the filling valve 31.

As previously discussed, vortex flowmeter 1 is designed to detect, when the respective filling valve 31 is arranged in the open position, the flow rate of pourable product that flows through respective duct 32, and to generate a detection signal $S_d$ indicative of the flow rate of the pourable product in the same duct 32. Detection signal $S_d$ is a pulse-train electrical signal, comprising a number of pulses, each indicative of a pressure spike due to a detected vortex.

In particular, in the vortex flowmeter 1 the electrical quantity detected by the internal sensor due to pressure spikes (see previous discussion) is amplified, filtered and then transformed into a square wave signal, e.g. by a Smith Trigger (or a similar circuit solution), so as to generate the pulsed detection signal $S_d$.

Detection signal $S_d$ is therefore in this case substantially a raw signal, meaning that it is not the result of further processing performed within the vortex flowmeter 1; in other words, no other processing steps are performed, apart from the steps leading to generation of the raw electrical pulses starting from the pressure spikes.

In a manner not shown, but that is discussed in detail in the above referenced WO 2012/085828, filling system 20' may further include: one or more flow-lineariser devices, arranged upstream and/or downstream of the vortex flowmeter 1, for linearising the flow of the pourable product along the duct 32; and one or more throttling devices selectively arranged along the same duct 32 and designed to cause a reduction in the filling speed and maximum flow rate.

Local control unit 23 of filling device 20 is operatively coupled to the vortex flowmeter 1, to receive the detection signal $S_d$ at a first input 23a, and is moreover coupled to a temperature sensor 33 outputting an operating temperature T, at a second input 23b.

According to a particular aspect of the present solution, local control unit 23 comprises: a control module 40, configured to control (in a known manner, here not discussed in detail) filling valve 31 of filling device 20 based on information associated with the detection signal $S_d$ coming from the vortex flowmeter 30, and through a suitable driving signal $S_{drv}$ provided at an output 23c, in order to fill the container 12 with a desired amount (level) of pourable product; a processing module 42, configured to implement (as discussed below in detail) processing operations on the detection signal $S_d$ coming from the vortex flowmeter 1, in real time and during operation of the filling device 20; and a non-volatile memory 43.

Control module 40 further communicates with the central control unit 22 of the filling machine 10, e.g. receiving control signals or providing feedback signals at a further input/output port 23d.

Processing module 42 is configured to compensate for measuring errors, e.g. due to vibrations in the filling machine 10, pressure back-flows along the duct 32 and/or variations in the machine operating parameters, that would lead to errors in the flow rate determination.

In particular, the present Applicant has realized that, although number of pulses $N_p$ in the detection signal $S_d$ is proportional to volume V of the filling product, according to the expression:

$$V = K_f \cdot N_p$$

proportionality coefficient $K_f$ is not constant, but instead may vary according to the instantaneous operating conditions, and in particular as a non-linear function f of the flow rate Fr and operating temperature T of the product:

$$K_f = f(Fr[p/s], T[°C.]).$$

Accordingly, computation of the exact amount of product into the container 12 requires determination of the proportionality coefficient $K_f$ according to the instantaneous flow rate Fr and product temperature T, in order to compensate for non linearity of the same proportionality coefficient $K_f$, or, in other words, linearization of the same proportionality coefficient $K_f$.

Figure 4:
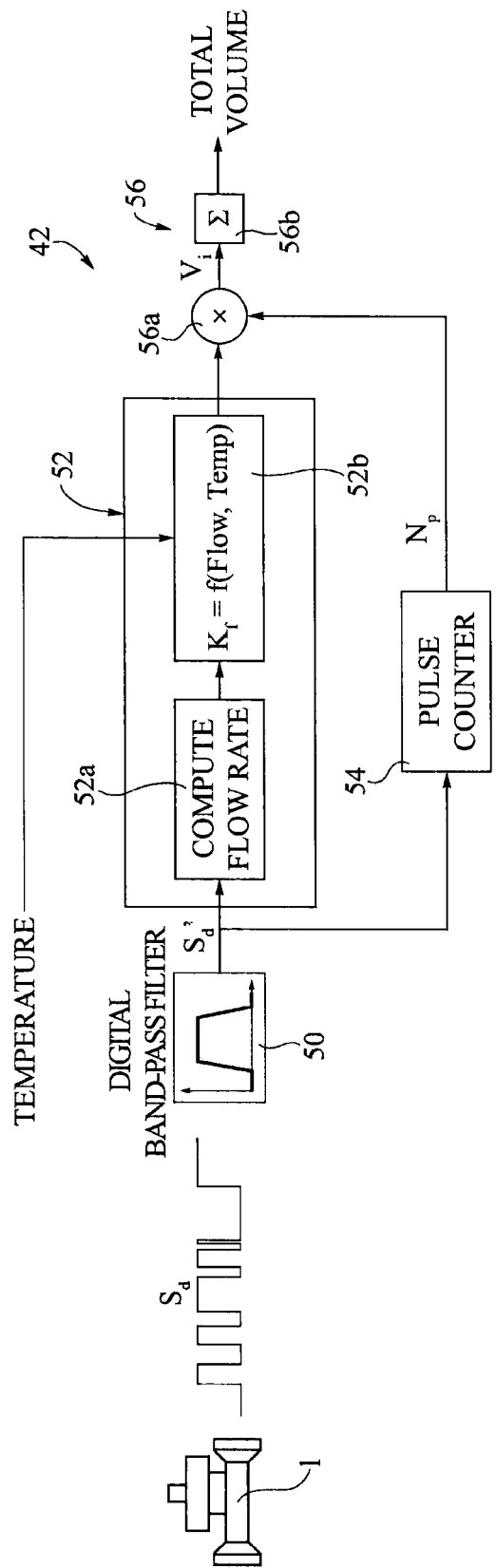
FIG. 4 is a block diagram of a processing circuit coupled to a vortex flowmeter and integrated in a local control unit of the filling system of FIG. 3.

As shown in FIG. 4, processing module 42 of local control unit 23 therefore comprises:
- a filter stage 50, which receives the detection signal $S_d$ and provides a filtered signal $S_d'$;
- a compensation stage 52, which receives the filtered signal $S_d'$ and the temperature T detected by temperature sensor 33, and is configured to calculate the proportionality coefficient $K_f$ according to function f;
- a counter stage 54, which receives the filtered signal $S_d'$ and is configured to count the number of pulses $N_p$ thereof;
- a computation stage 56, which receives the number of pulses $N_p$ from the counter stage 54 and the proportionality coefficient $K_f$ from the compensation stage 52 and calculates the total volume of product flown into the container 12.

In particular, filter stage 50 is a digital band pass filter, which is configured to evaluate the digital output of the vortex flowmeter 1 (the detection signal $S_d$) by means of an interrupt routine and a fast digital timer. If time intervals associated to the pulses (in particular, the interval between the rise edge and the fall edge of a given pulse, or between the fall edge and the rise edge of two consecutive pulses) is higher/lower than a given threshold time, filter stage 50 is configured to reject the pulse or pulses, that are thus not considered for the further processing steps.

This digital filtering allows to reject spurious pulses due to machine vibration and/or pressure bursts or any other source of disturbance. Only the pulses with a specific form factor will continue to the next processing steps.

Compensation stage 52 includes: a flow-rate calculation block 52a, which is configured to calculate the flow rate Fr of the pourable product based on the received filtered signal $S_d'$, in particular based on the frequency of the pulses of the same signal (in a per se known manner, here not discussed in detail); and a coefficient calculation block 52b, which calculates the corrected, or compensated, value of the proportionality coefficient $K_f$ based on the non-linear function f applied to the operating temperature T and the calculated flow rate Fr.

Due to the high non linearity of function f, the plot of the same function can be determined, e.g. via experimental tests and a characterization procedure, and stored, e.g. as a float array, in the non-volatile memory 43 of local control unit 23. During operation, the coefficient calculation block 52b may determine the actual value of the proportionality coefficient $K_f$ looking at the values of function f stored in non-volatile memory 43.

According to a possible embodiment, both compensation stage 52 and counter stage 54 are configured to process the filtered signal $S_d'$ within time intervals on a given time base, e.g. having a value of 50 ms. In particular, the flow rate is each time calculated on a given number of pulses $N_p$ detected in a time interval equal to the time base; likewise, the counter stage 54 is configured to count the number of pulses $N_p$ detected during the same time interval.

Use of a suitable time base allows to take into proper account the fast dynamic of the filling process and the high rate of variation of the operating conditions associated to the same filling process; a proper value of the time base is chosen (e.g. 50 ms), that is sufficient to have a good resolution and fast enough to follow the variations occurring during the filling process.

Computation stage 56 includes: a multiplication block 56a, which calculates a partial volume $V_i$ of pourable product for each consecutive processing time interval, multiplying the number of pulses $N_p$ detected in the same time interval and the compensated value of the proportionality coefficient $K_f$ (also determined in the same time interval); and an output summation block 56b, which computes the summation of the partial volumes $V_i$ in the various processed time intervals in order to determine the total volume V, at each time representing a real time computation of the real volume of pourable product that has flown into container 12 (and correspondingly of the real level of fluid within the same container 12).

Control module 40 receives the calculated total volume V from the processing module 42 and consequently controls the filling valve 31 of filling device 20, in order to reach the desired level in the container 12.

Processing module 42 and control module 40 may be implemented via software and/or hardware in the local control unit 23; in a possible embodiment, both the processing module and the control module 40 are implemented by a same processing unit (including a microprocessor, a Digital Signal Processor, a Field Programmable Gate Array, or any other kind of processing unit).

The present Applicant has moreover realized that the above function f for calculating the proportionality coefficient $K_f$, although being substantially similar for the various vortex flowmeters 1 of the filling systems 20' in the filling machine 10, is not exactly identical due e.g. to fabrication tolerances.

Figure 5:
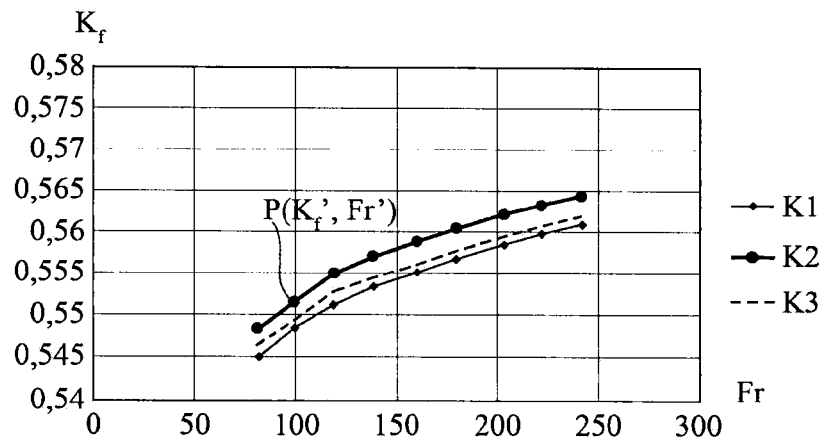
FIG. 5 shows plots of electrical quantities related to the filling system of FIG. 3.

As shown in FIG. 5, three vortex flowmeters 1 may therefore have three different compensation curves for the respective function f (denoted as k1, k2 and k3), at a same operating temperature T, and those compensation curves will be offset at different temperatures. In particular, the present Applicant has realized that the different curves have, however, a common standard plot, and, although being different, may substantially be superimposed one with the other by a suitable translation.

Accordingly, it is sufficient to know a single value $K_f'$ for the proportionality coefficient $K_f$ at a single flow rate Fr' (i.e. a single point P of function f, see FIG. 5), to be able to determine the values of proportionality coefficient $K_f$ for any other flow rate value, following the curve having the standard common plot and passing through the known point P (in the example, curve k2).

A further aspect of the present solution thus envisages implementation of an automatic calibration procedure executed at the filling machine 10, designed to accurately determine at least one single value of flow rate and a corresponding value of the proportionality coefficient $K_f$ for each vortex flowmeter 1, so as to determine which compensation offset curve is to be used for any vortex flowmeter 1. The calibration point is suitably stored in the non-volatile memory 43 of the respective local control unit 23.

In detail, this calibration procedure is executed by central control unit 22 of filling machine 10, e.g. during a start-up or initialization phase, or during a dedicated calibration phase that is executed after normal operation is temporarily interrupted.

Figure 6:
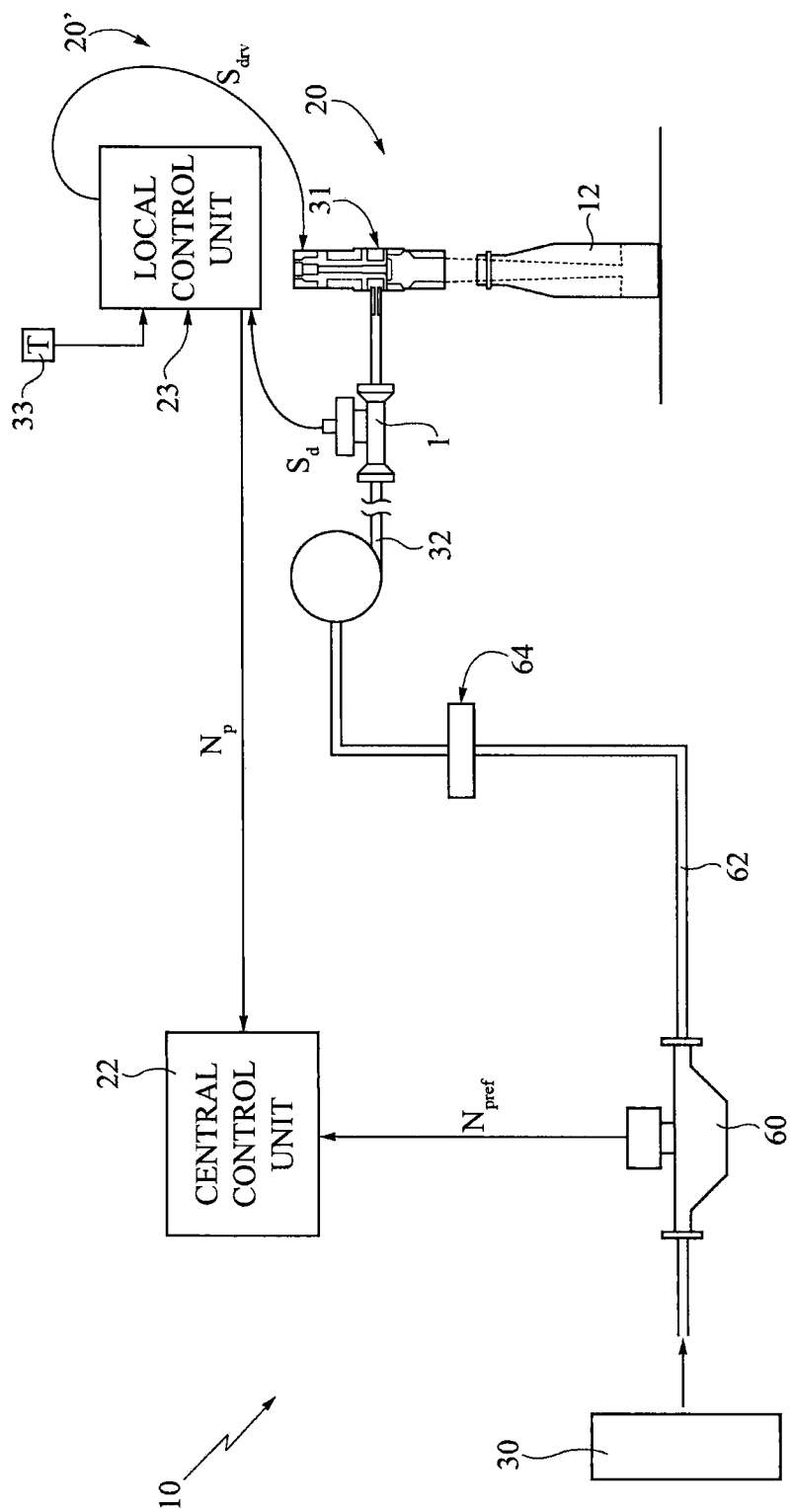
FIG. 6 is a diagrammatic representation of the filling system of FIG. 3, during execution of a calibration procedure.

As shown in FIG. 6 (which again depicts a single filling system 20', for sake of simplicity), a reference mass flowmeter 60 is in this case arranged downstream the product tank 30, in the filling machine 10, e.g. in a stationary portion of the filling machine 10, along a product feeding pipe 62 that is coupled to the various ducts 32 of the filling systems 20' by means of a rotary ring 64.

Central control unit 22 is operatively coupled to the local control units 23 of the filling systems 20', to receive the number of pulses $N_p$ associated to the respective detection signals $S_d$, and moreover to the reference mass flowmeter 60, to receive a reference number of pulses $N_{pref}$ associated to a reference detection signals $S_{ref}$.

Central control unit 22 controls operation of the filling systems 20' in order to implement the calibration procedure.

Figure 7:
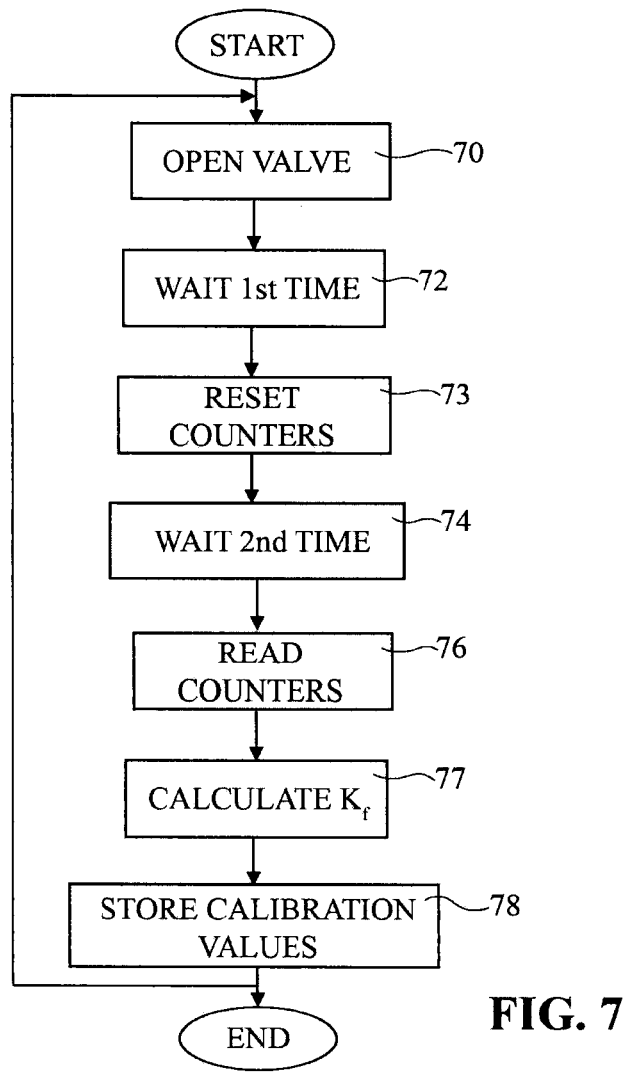
FIG. 7 is a flow chart of calibration operations, according to a possible embodiment of the present solution.

Referring also to the flow chart of FIG. 7, this calibration procedure envisages, for each filling system 20' of the filling machine 10 that is individually considered for the calibration, a first step 70, where the filling valve 31 of the considered filling system 20' is opened, while the filling valves 31 of all the other filling systems 20' are kept closed; accordingly, the reference mass flowmeter 60 and the vortex flowmeter 1 of the considered filling system 20' detect a same calibration flow rate of filling product.

Next, step 72, a first wait time, e.g. of 10 s, is implemented in order to allow stabilization of the flow speed.

Afterwards, at step 73, pulse counters associated to the reference mass flowmeter 60 and the vortex flowmeter 1 are reset.

A second wait time is then implemented, at step 74.

Since volume counters of reference mass flowmeter 60 and vortex flowmeter 1 are not synchronized, the counter values have an intrinsic error, e.g. of +/−1. The second wait time, e.g. of 20 s, is required to minimize such synchronization errors, and therefore reduce the consequent errors in the calibration of proportionality coefficient $K_f$. In particular, second wait time is properly chosen, considering that a lower time may produce higher errors, while a higher wait time may cause waste of time and product.

Afterwards, step 76, the central control unit 22 reads the volume counters of reference mass flowmeter 60 and vortex flowmeter 1, substantially at a same time, and the associated number of pulses $N_{pref}$, $N_p$ (that correspond to the same calibration flow rate).

The central control unit 22 thereby computes, step 77, the calibration value $K_f'$ of proportionality coefficient $K_f$ related to the calibration flow rate Fr' for the considered vortex flowmeter 1, using the following expression:

$$K_f' = V_{ref}/N_p$$

wherein $V_{ref}$ is the volume of product calculated (in a known manner) based on the number of pulses $N_{pref}$ detected by the reference mass flowmeter 60.

The central control unit 22 then stores, step 78, the calibration values in the non-volatile memory 43 of the local control unit 23 (in particular, the calibration values of the proportionality coefficient $K_f'$ and flow rate Fr', and the associated calibration temperature T).

As previously discussed, knowledge of the calibration value of the proportionality coefficient $K_f$ at the calibration flow rate will allow the local control unit 23 to correctly evaluate the non-linear function f during operation of the filling system 20' (by selecting the corresponding curve and offset associated to the known operating point).

Calibration process is then iteratively repeated (process thus return to step 70) for all the remaining filling system 20' of filling machine 10, so as to calibrate the corresponding vortex flowmeters 1.

The advantages that the described solution allows to achieve are clear from the foregoing description.

Indeed, the discussed solution provides a more reliable and accurate control of the filling level in the filled containers, thanks to the correction, compensation and calibration procedures implemented on the output of the vortex flowmeters in the electronic processing modules integrated in the local control units of the various filling devices.

These processing operations are conveniently executed in real time, during the filling operations, so as to timely minimize any errors.

In particular, the present Applicant has realized that integrating the processing electronics for compensation and calibration of the vortex flowmeter output in the local control units, i.e. externally and separately from the same flowmeter (as opposed to integration into the same sensors), entails a number of advantages, among which:
- a fastest response: into local control unit 23, computation of the proportionality coefficient $K_f$ may be done more frequently, e.g. every 50 ms, and, moreover, the volume counter computation may be updated every vortex pulses (in this respect, counting the raw vortex pulses is the fastest way to compute the volume and flow rate);
- filtering operations may be dynamically optimized according to the different filling process phases, which are controlled by the same local control unit 23;
- a single temperature transducer (required to detect the operating temperature, needed for the compensation procedure), read by the various local control units 23 of the filling systems 20' may be used, instead of a plurality of sensors, each integrated in a respective flowmeter, thus reducing costs and complexity;
- higher operating temperatures may be withstood (this is important e.g. for CIP—Cleaning In Place—operating phases in the filling machine 10);
- cost of the vortex flowmeters may be reduced (since no processing electronics is required, and all processing needed to transform the electrical pulses into fluid volume is carried out externally, within local control units 22).

Finally, it is clear that modifications and variations may be applied to the solution described and shown, without departing from the scope of the appended claims.

In particular, it is again underlined that the present solution finds advantageous application in any filling machine including at least one filling system, envisaging use of a vortex flowmeter to control the level of a pourable product fed into a container.

The invention claimed is:

1. A filling system for filling a container with a pourable product, comprising:
   a tank configured to be filled with the pourable product;
   at least one filling device including a local control unit having a control module configured to selectively allow filling of the container with the pourable product, wherein the local control unit is configured to receive a control signal for filling of the container with the pourable product from a central control unit;
   at least one duct interposed between the tank and the filling device; and
   at least one vortex flowmeter disposed along the duct and configured to generate a pulse-train detection signal as a function of a flow rate of the pourable product along the duct,
   wherein the local control unit of the filling device includes a processing module configured to process the detection signal from the at least one vortex flowmeter and to process the control signal from the central control unit, in order to determine an amount of the pourable product flowing into the container, as a function of a number of pulses of the detection signal and as a function of the control signal from the central control unit.

2. The filling system according to claim 1, wherein the processing module is configured to calculate a volume of the pourable product in a given time interval, by multiplying the number of pulses of the detection signal in the given time interval, by a proportionality coefficient, and wherein the processing module is configured for real-time calculation of a value of the proportionality coefficient, based on a non-linear function of the flow rate.

3. The filling system according to claim 2, wherein the processing module includes a first calculation stage configured to determine a value of the flow rate in a given time interval based on the detection signal, and a second calculation stage configured to calculate the value of the proportionality coefficient applying the non-linear function to the calculated flow rate and to a detected operating temperature.

4. The filling system according to claim 3, wherein the local control unit includes a non-volatile memory operatively coupled to the processing module, and wherein the second calculation stage of the processing module is configured to retrieve from the non-volatile memory information related to a plot of the non-linear function for calculation of the proportionality coefficient.

5. The filling system according to claim 4, wherein the second calculation stage of the processing module is further configured to retrieve from the non-volatile memory a calibration point for the non-linear function, including a calibration value of the proportionality coefficient for a calibration flow rate, obtained in a calibration procedure.

6. The filling system according to claim 2, wherein the processing module further includes a pulse counter configured to count the number of pulses of the detection signal in a given time interval.

7. The filling system according to claim 1, wherein the processing module includes a filtering stage configured to discard one or more pulses in the detection signal if the interval between rise edge and fall edge of a given pulse, or between fall edge and rise edge of two consecutive pulses, is higher or lower than a given threshold time.

8. A filling machine comprising:
   a plurality of filling systems according to claim 1;
   a conveyor rotating about an axis and carrying respective filling devices, wherein the tank is arranged outside or inside the conveyor; and
   a central control unit, operatively coupled to respective local control units of the filling systems in order to control filling operations thereof.

9. The filling machine according to claim 8, including a reference flowmeter arranged downstream of the tank, along a product feeding pipe that is selectively coupled to respective ducts of the filling systems, and wherein the central control unit is operatively coupled to the local control units of the filling systems to receive the respective number of pulses associated with the detection signals generated by respective vortex flowmeters, and wherein the central control unit is operatively coupled to the reference flowmeter to receive a reference number of pulses associated with related reference detection signals, the central control unit being configured to implement a calibration procedure for determining a respective calibration parameter for each vortex flowmeter, based on the respective number of pulses and the reference number of pulses, when the respective duct is coupled to the product feeding pipe so that the vortex flowmeter and the reference flowmeter are flown by a same reference flow rate of the pourable product.

10. The filling machine according to claim 9, wherein the processing module is configured to calculate the volume of the pourable product in a given time interval by multiplying the number of pulses of the detection signal in the given time interval, by a proportionality coefficient, and wherein the processing module is configured to calculate the value of the proportionality coefficient according to a non-linear function of the flow rate of the pourable product and of an operating temperature, and wherein the calibration parameter is a calibration point for the non-linear function, including a known value of the proportionality coefficient at the known reference flow rate, obtained in the calibration procedure.

11. The filling machine according to claim 9, wherein each local control unit includes a non-volatile memory operatively coupled to the processing module, and the central control unit is configured to store in the non-volatile memory the respective calibration parameter.

12. A method for filling a container with a pourable product, comprising:
 filling the container with the pourable product, via a filling device including a local control unit having a control module configured to selectively allow the filling of the container with the pourable product, wherein the local control unit is configured to receive a control signal for filling of the container with the pourable product from a central control unit;
 feeding the pourable product contained in a tank, via a duct, towards the filling device, wherein filling the container includes measuring the flow rate of the pourable product, via a vortex flowmeter disposed along the duct and generating a pulse-train detection signal as a function of a flow rate of the pourable product along the duct; and
 processing, via the local control unit of the filling device, the detection signal and the control signal from the central control unit in order to determine an amount of the pourable product flowing into the container as a function of a number of pulses of the detection signal and as a function of the control signal from the central control unit.

13. The method according to claim 12, wherein a reference flowmeter is arranged downstream of the tank, along a product feeding pipe that is selectively coupled to the duct of the filling device, and wherein the method further comprises:
 receiving, via a central control unit, the number of pulses associated with the detection signal from the local control unit of the filling device, and a reference number of pulses associated with a related reference detection signal from the reference flowmeter; and
 implementing, via the central control unit, a calibration procedure for determining a calibration parameter for the vortex flowmeter, based on the number of pulses and the reference number of pulses, when the duct is coupled to the product feeding pipe so that the vortex flowmeter and reference flowmeter are flown by a same reference flow rate of the pourable product.

14. The method according to claim 13, wherein processing, via the local control unit, includes calculating the volume of the pourable product in a given time interval by multiplying the number of pulses of the detection signal in the given time interval, by a proportionality coefficient; and
 calculating the value of the proportionality coefficient according to a non-linear function of the flow rate of the pourable product and of an operating temperature, and wherein the calibration parameter is a calibration point for the non-linear function, including a known value of the proportionality coefficient at the known reference flow rate, obtained in the calibration procedure.

15. The method according to claim 14, wherein the local control unit further includes a non-volatile memory, and wherein the method further includes storing in the non-volatile memory the calibration parameter.

16. The filling system according to claim 1, wherein the control signal from the central control unit includes at least one calibration parameter of the at least one vortex flowmeter.

17. A filling machine for filling containers with a pourable product, comprising:
 a rotating conveyor configured to transport containers to be filled and rotatable about an axis;
 a plurality of filling systems connected to the rotating conveyor and configured to move about the axis along a path;
 a tank for a pourable product connected to each filling system through a corresponding duct;
 a filling valve provided in each filling system and having an opening and a shutter element, the shutter element configured to move between a closed position, in which the filling valve prevents pourable product from flowing from the corresponding duct to a respective container on the conveyor through the opening, and an open position, in which the filling valve allows the pourable product to flow from the corresponding duct and through the opening into the container on the conveyor during movement of the respective filling system along the path;
 a vortex flowmeter interposed along each duct between the tank and the filling valve, the vortex flowmeter configured to generate a pulse-train detection signal as a function of a flowrate of the pourable product through the duct when the shutter element is in the open position;
 a central control unit configured to provide control signals for actuation of the filling valves for filling the containers with the pourable product; and
 a local control unit associated with each filling system and operably connected to the central control unit through a communication bus, wherein each local control unit is configured to control actuation of the filling valve based on the pulse-train detection signal from the respective vortex flowmeter and the control signals from the central control unit.

18. The filling machine according to claim 17, wherein at least one local control unit includes:
 a control module configured to control the filling valve based on information associated with the pulse-train detection signal from the vortex flowmeter and through a driving signal to fill a container with an amount of the pourable product; and a processing module configured to implement real-time processing operations on the pulse-train detection signal from the vortex flowmeter during operation of the filling system, wherein the control module is configured to receive a calculated total volume from the processing module and to control the filling valve to reach a desired level of the pourable product in the container.

19. The filling machine according to claim 17, wherein for at least one filling system:

the filling valve has a valve housing, the local control unit is integrated in a printed circuit board, and the printed circuit board is coupled to the valve housing.

20. The filling machine according to claim to claim 17, further comprising a reference mass flowmeter located downstream of the tank, wherein the central control unit is operatively coupled to the local control units to receive a number of pulses of the pulse-train detection signal, and to the reference mass flowmeter to receive a reference number of pulses associated with a reference detection signal.

\* \* \* \* \*